United States Patent
Miller

[11] Patent Number: 6,048,376
[45] Date of Patent: Apr. 11, 2000

[54] COMBINATION BAFFLE AND FILTER ELEMENT SYSTEM FOR REMOVING OIL FROM AN OIL/GAS MIXTURE

[75] Inventor: David B. Miller, Advance, N.C.

[73] Assignee: Ingersoll-Rand Company, Woodcliff Lake, N.J.

[21] Appl. No.: 09/127,755

[22] Filed: Aug. 3, 1998

[51] Int. Cl.[7] ............ B01D 36/00; B01D 39/12; B01D 39/20; B01D 45/08
[52] U.S. Cl. ............... 55/320; 55/325; 55/326; 55/330; 55/392; 55/426; 55/432; 55/442; 55/465; 55/466; 55/523; 55/525; 96/190
[58] Field of Search ............ 55/320, 321, 325, 55/326, 329, 330, 332, 426, 442, 392, 525, 526, 523, DIG. 17, 340, 432, 462, 465, 466; 96/189, 190

[56] References Cited

U.S. PATENT DOCUMENTS

| | | |
|---|---|---|
| 1,896,833 | 2/1933 | Bramsen et al. . |
| 2,095,586 | 10/1937 | Algard .................................. 55/330 |
| 2,511,967 | 6/1950 | Campbell . |
| 2,746,562 | 5/1956 | Ryall . |
| 2,894,599 | 7/1959 | Leininger ............................. 55/325 |
| 3,093,469 | 6/1963 | Woolston et al. . |
| 3,212,234 | 10/1965 | McMinn . |
| 3,339,350 | 9/1967 | Sims . |
| 3,593,500 | 7/1971 | Ritland et al. ....................... 55/329 |
| 3,654,748 | 4/1972 | Bloom . |
| 3,721,069 | 3/1973 | Walker . |
| 3,791,105 | 2/1974 | Rhodes . |
| 3,807,144 | 4/1974 | Graybill . |
| 3,923,480 | 12/1975 | Visch . |
| 3,925,044 | 12/1975 | Tu et al. . |
| 3,997,303 | 12/1976 | Newton ............................... 55/320 |
| 4,092,137 | 5/1978 | Howe et al. . |
| 4,385,912 | 5/1983 | Parrick et al. . |
| 4,491,460 | 1/1985 | Tokar . |
| 4,531,955 | 7/1985 | Cash et al. ........................... 55/340 |
| 4,668,252 | 5/1987 | Gerdau . |
| 4,673,423 | 6/1987 | Yumlu . |
| 4,848,989 | 7/1989 | Maeda . |
| 4,941,900 | 7/1990 | Cordes . |
| 5,026,407 | 6/1991 | Tobey . |
| 5,092,911 | 3/1992 | Williams et al. . |
| 5,314,529 | 5/1994 | Tilton et al. . |
| 5,599,365 | 2/1997 | Alday et al. . |

*Primary Examiner*—David A. Simmons
*Assistant Examiner*—Robert A. Hopkins
*Attorney, Agent, or Firm*—Michael M. Gnibus

[57] ABSTRACT

A separator tank for removing oil from a gas/oil mixture includes a lower chamber for collecting the oil removed from the gas/oil mixture, an intermediate chamber overlying the lower chamber and an upper chamber overlying the intermediate chamber. The separator tank has an inlet in fluid communication with the intermediate chamber for introducing the gas/oil mixture into the separator tank at a velocity. The intermediate chamber includes a baffle adapted for changing the velocity of the gas/oil mixture as the mixture travels between the inlet and the upper chamber for causing at least some of the oil to separate from the gas/oil mixture. The upper chamber has a diffusing element for reducing the velocity of the gas/oil mixture and an oil coalescing element for separating at least some of the oil from the gas/oil mixture. The separator tank includes an outlet in fluid communication with the upper chamber for discharging the gas from the separator tank after substantially all of the oil has been removed from the gas/oil mixture.

22 Claims, 8 Drawing Sheets

COMBINATION BAFFLE AND FILTER ELEMENT SYSTEM FOR REMOVING OIL FROM AN OIL/GAS MIXTURE

BACKGROUND OF THE INVENTION

The present invention relates to a separator for removing entrained particles from a gas stream and specifically relates to an oil separator for removing oil, moisture and other contaminants from a stream of compressed air.

Many types of air compressor systems, particularly those having rotors or screws, use large amounts of oil. The oil is typically injected into the compressor housing for a number of reasons including cooling the air compressor system, lubricating the bearings, balancing axial forces and sealing the rotors. Although using oil is essential for operating these particular types of systems, the oil must be removed from the stream of compressed air before the product may be used downstream for pneumatic equipment and/or other tools.

In certain prior art embodiments, oil separators include a first unit which serves as an oil reservoir, a second unit which functions as a cyclonic separator and finally a third unit including a demister or filter through which compressed air is conducted to remove any residual oil. These several units are generally arranged in a serial configuration which requires complex couplings and piping occupying considerable space.

Commonly assigned U.S. Pat. No. 4,092,137, the disclosure which is hereby incorporated by reference herein, discloses a separating system in which all of the constituent elements (i.e. the oil reservoir, the cyclonic separator and the filter) are combined in one single unit. Specifically, the '137 patent discloses a substantially L-shaped tank which includes both a vertical housing including a liquid-reservoir and a horizontal housing including a filter through which compressed gas, having liquid entrained therein, is conducted. The compressed gas is initially guided along a centrifugal path through the vertical housing for separating the liquid from the gas and is then passed through a filter within the horizontal housing for removing any additional fluid remaining in the compressed gas.

Figure 1:
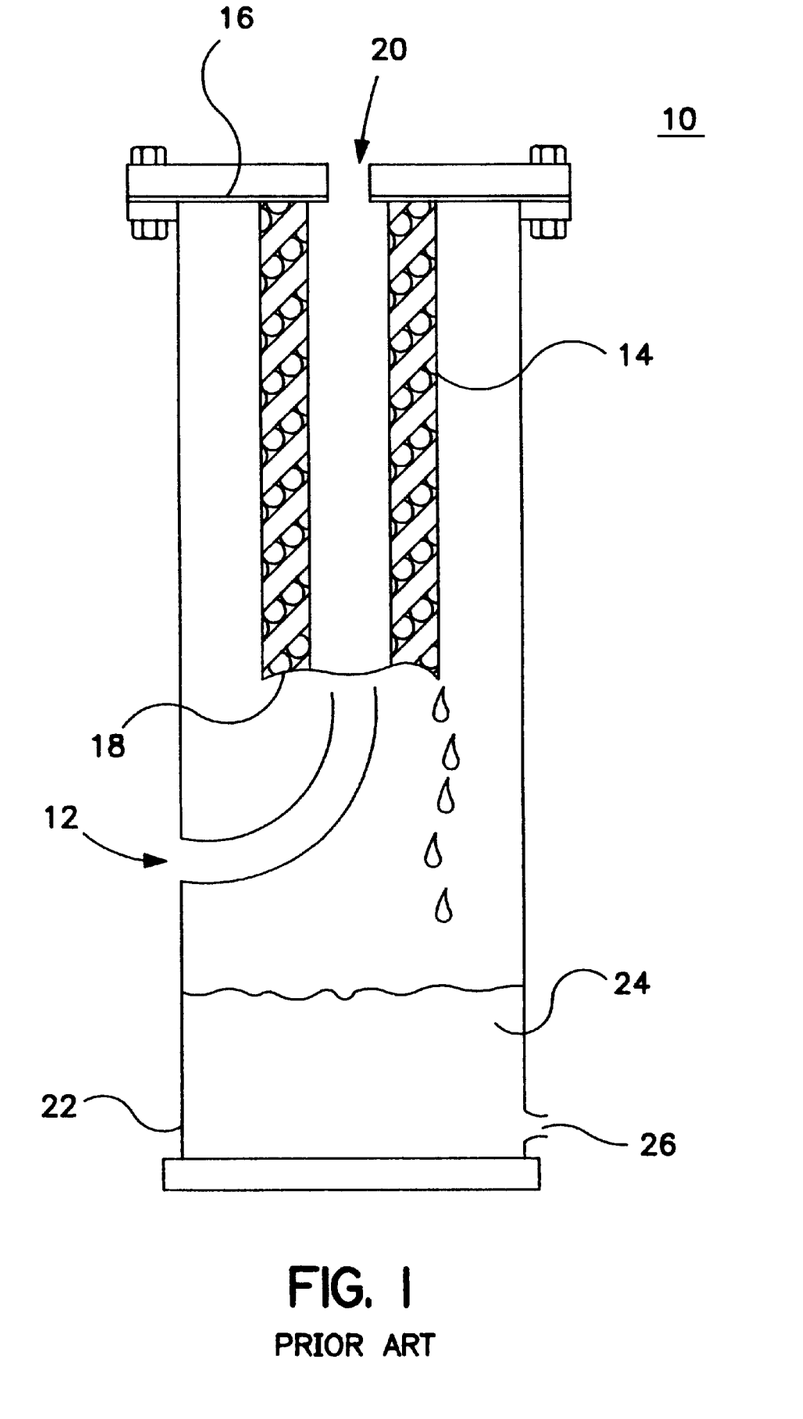
FIG. 1 shows a cross-sectional view of a prior art air/oil separator.

FIG. 1 shows a typical prior art oil separator system 10 having an inlet 12 for introducing an air/oil mixture into the separator 10 and a replaceable filter 14 which is secured adjacent a top portion 16 thereof. The air/oil mixture is directed toward a bottom 18 of the filter 14. In operation, the air/oil mixture strikes the bottom surface 18 of the filter element whereupon the compressed air passes through the filter and towards an outlet 20. However, the oil in the air/oil mixture is not able to pass through the filter 14 and drops toward an oil collecting reservoir located at a lower end 22 of the separator tank 10. The oil 24 in the reservoir is then removed from the separator tank 10 through an oil outlet 26. Although the oil separator shown in FIG. 1 has proven to be somewhat successful in removing oil from an air/oil mixture, there are many problems associated with this particular design. Specifically, the design requires the use of a separate, expensive oil filter element which must be replaced and/or maintained on a regular basis. In addition, the filter comprises a very dense media which results in a high pressure drop in the compressed air as the air passes through the filter. As a result, the overall efficiency of the compressor system is reduced. The filter media generally includes a multi-layered interface, such as a sheet of paper having multiple layers, which allows the compressed air, but not the oil, to pass through. As a result, after a few hours of operating the system the multi-layered interface typically becomes saturated with oil, a situation which degrades the performance of the filter. This results in a significant pressure drop because the compressed air has a more difficult time moving through the oil saturated interface of the filter. Yet another problem exists with smaller oil separating elements wherein the air velocity through the small separators is too high to provide good air/oil separation. As a result, there is a need for a small oil separator which is capable of reducing the velocity of the air stream to a level sufficient for removing an adequate amount of oil from the air/oil mixture.

The present invention overcomes the above-mentioned problems by providing a separator element which does not require an expensive filter which must be continually replaced and/or maintained on a regular basis. The present invention also provides a small separator tank (i.e. a tank having an outer diameter of six inches or less) which is capable of reducing the velocity of the air stream in the tank to an acceptable level. The present invention also provides a separator tank having a barrier layer which isolates oil separated from a gas/oil mixture so that the separated oil is not repeatedly exposed to the gas/oil mixture flowing through the tank. Thus, the barrier layer allows the separated oil to collect in an oil storage area in a lower chamber of the separator tank without allowing significant air movement within the oil storage area.

SUMMARY OF THE INVENTION

In accordance with one preferred embodiment of the present invention a separator tank for removing oil from a gas/oil mixture includes a lower chamber for collecting the oil removed from the gas/oil mixture, an intermediate chamber overlying the lower chamber, and an upper chamber overlying the intermediate chamber. In certain preferred embodiments the separator tank has an outer wall, such as a substantially cylindrical wall, which at least partially surrounds the lower, intermediate and upper chambers. The outer wall of the separator tank preferably has an outside diameter of six inches or less.

The separator tank preferably includes a barrier layer which extends between and substantially separates the lower chamber from the intermediate chamber of the tank for preventing the oil collected in the lower chamber from becoming reentrained in the gas/oil mixture. The barrier layer preferably includes one or more openings extending therethrough so that the oil removed from the gas/oil mixture may pass through the one or more openings and into the lower chamber. A discharge valve may be provided in fluid communication with the lower chamber so that any oil collected in the lower chamber may be selectively removed from the chamber upon opening the valve.

The separator tank also preferably includes an inlet in fluid communication with the intermediate chamber of the tank for introducing the gas/oil mixture into the separator tank at a predetermined velocity. In certain embodiments, the gas/oil mixture is introduced through the inlet at approximately 2500–3000 feet/minute. The separator tank also preferably includes one or more outlets in fluid communication with the upper chamber for discharging gas from the separator tank after the gas/oil mixture has passed through the upper chamber and after substantially all of the oil has been removed therefrom. Each outlet preferably includes one or more baffles for removing additional oil from the gas/oil mixture. In certain embodiments, the one or more outlets are located adjacent the upper end of the tank.

The intermediate chamber of the tank preferably includes a baffle which is adapted for changing the velocity of the gas/oil mixture introduced through the inlet as the gas/oil mixture travels between the inlet and the upper chamber. After the gas/oil mixture enters the inlet, the lighter gas deflects off the baffle and continues upward toward the upper chamber. Simultaneously, the oil, which is heavier, tends to travel in a relatively straight path until it impinges upon the baffle or an inner wall of the separator tank. In certain embodiments, the baffle in the intermediate chamber preferably includes one or more projections which extend from the inner wall of the separator tank. In other preferred embodiments the baffle includes a series of projections which extend in an alternating pattern from opposite sides of the inner wall of the separator tank. The baffle in the intermediate chamber is adapted to deflect and/or change the velocity of the gas/oil mixture introduced into the separator tank through the inlet which causes at least some of the oil to separate from the gas/oil mixture. As used herein the term "velocity" includes both the axial direction and speed (measured in feet/minute) of the gas/oil mixture as the mixture travels through the separator tank. After the oil has been separated from the gas/oil mixture, gravitational forces and pressure differential result in the oil moving downward toward the lower chamber.

The intermediate chamber also preferably includes one or more conduits in fluid communication with the baffle. The one or more conduits direct at least some of the oil removed from the gas/oil mixture toward the one or more openings in the barrier layer. The intermediate chamber may also include at least one oil scavenge extending through the outer wall of the tank for discharging at least some of the oil removed from the gas/oil mixture. In other words, at least some of the oil separated from the mixture may be discharged outside the tank through the at least one oil scavenge. The oil discharged through the oil scavenge is not stored in the lower chamber. The oil removed from the separator tank through the at least one oil scavenge is preferably redirected back upstream toward the inlet of the compressor or to a low pressure point in the oil piping system. In certain preferred embodiments, the oil scavenge opening into the intermediate chamber is located adjacent the upper chamber.

After a substantial amount of oil has been removed from the gas/oil mixture in the intermediate chamber, the mixture continues in an upward direction toward the upper chamber. The upper chamber is designed to diffuse and slow down the mixture, thereby providing a better environment for coalescing or collecting any oil remaining in the gas/oil mixture. In certain preferred embodiments, the upper chamber includes a diffusing element for reducing the velocity of the gas oil mixture and an oil coalescing element for separating at least some of the oil from the gas/oil mixture. The diffusing element may include a first flow element adapted for moving the gas/oil mixture in a substantially vertical direction and a second flow element adapted for moving the gas/oil mixture in a substantially horizontal direction. The first flow element may include a plurality of diffusing tubes having lower ends adjacent the intermediate chamber and upper ends remote therefrom. The diffusing tubes may have varying lengths. The second flow element preferably includes a substantially vertical wall having a plurality of apertures extending therethrough. In certain preferred embodiments, the respective lengths of the diffusing tubes increase as the distance from the substantially vertical wall increases.

In preferred embodiments, the oil coalescing element at least partially surrounds one or more of the diffusing tubes for removing at least some of the oil from the gas/oil mixture as the mixture passes through the upper chamber. The oil coalescing element may also be packed inside the diffusing tubes. The oil coalescing element may include a material selected from the group consisting of knitted mesh, metal wool, synthetic resin wool, metal beads, metal filings and porous ceramic material.

The substantially vertical wall preferably extends between the diffusing tubes and the one or more outlets of the separator tank. The substantially vertical wall may have a major face which opposes the one or more outlets and preferably includes a plurality of openings extending therethrough. The plurality of openings in the wall may have a diameter of between approximately 1 and 5 millimeters. In certain embodiments, at least some of the openings at the lower end of the vertical wall are smaller than at least some of the openings at the upper end thereof. In still other embodiments, the lower end of the wall has fewer openings than the upper end of the wall. The lengths of the respective diffusing tubes may increase as the distance between the tubes and the substantially vertical wall increases. The oil coalescing element may be in contact with the substantially vertical wall, such as by overlying the outer surface of the substantially vertical wall. The diffusing element and the coalescing element are designed to cooperate with one another. Generally, the diffusing element reduces the velocity of the gas/oil mixture as the mixture passes through the upper chamber, thereby enhancing the ability of the oil coalescing element to collect oil. In certain preferred embodiments, the upper chamber may include a second oil scavenge extending through the wall of the tank and opening into the upper chamber for drawing off at least some of the oil removed from the gas/oil mixture. As a result, a portion of the separated oil may be removed directly from the tank through the second oil scavenge and without first collecting that portion of the oil in the lower chamber. In still further embodiments, the upper chamber may include two or more oil scavenges.

Further objects of the present invention, as well as the novel features thereof, will become apparent by reference to the following description taken in conjunction with the accompanying drawings.

DETAILED DESCRIPTION OF PREFERRED EMBODIMENTS

Figure 2:
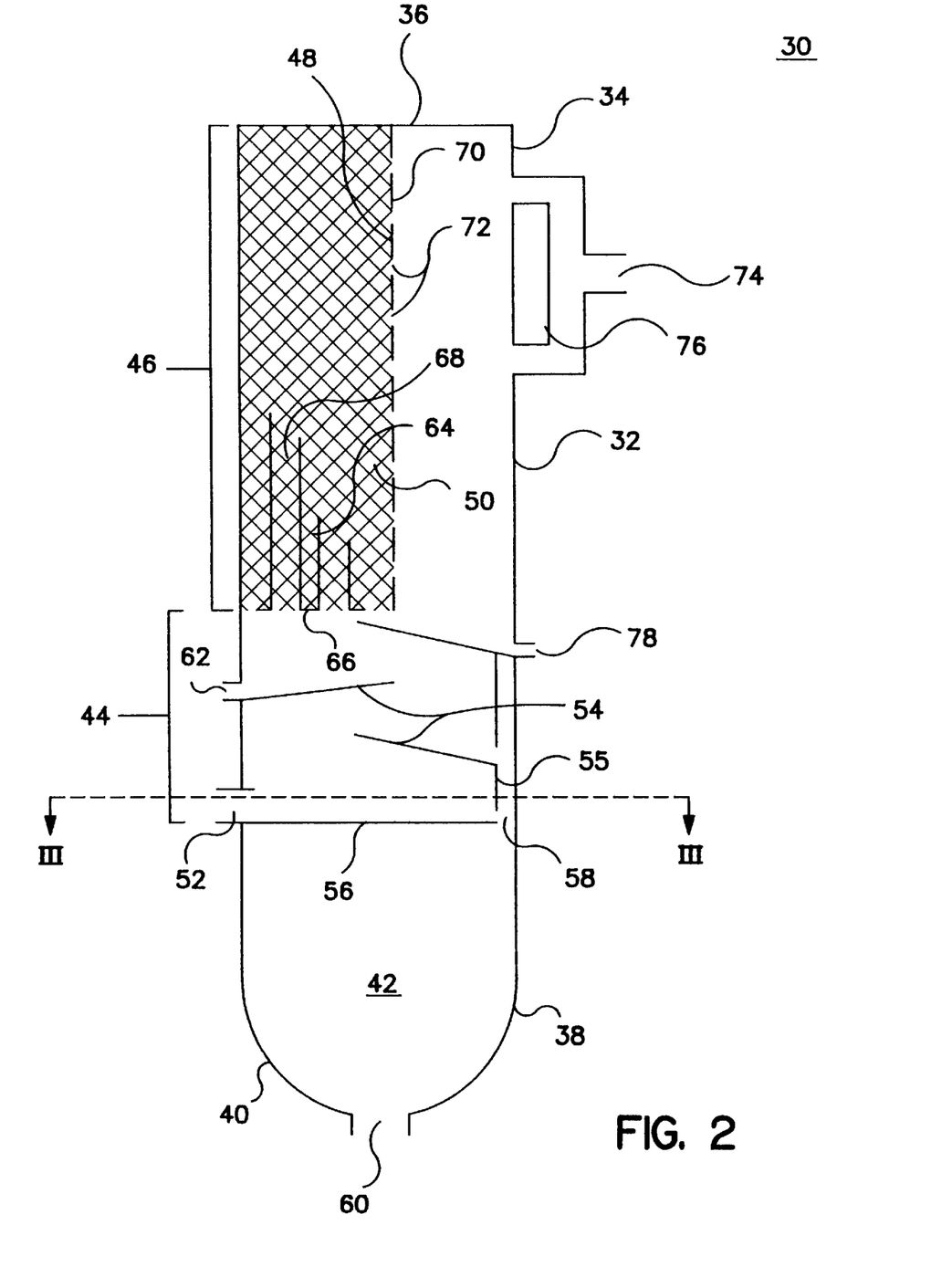
FIG. 2 shows a cross-sectional view of a separator tank in accordance with preferred embodiments of the present invention including lower, intermediate and upper chambers for removing entrained particles from a gas/oil mixture.

FIG. 2 shows an oil separator tank 30 in accordance with one preferred embodiment of the present invention. The oil separator tank 30 includes a substantially cylindrical wall 32 which is sealed at the upper end 34 thereof with a top wall 36 and at the lower end 38 thereof with a bottom wall 40. In certain embodiments, the bottom wall has a rounded on annular shape. The separator tank includes three distinct chambers: a lower chamber 42 for collecting oil removed from a gas/oil mixture; an intermediate chamber 44 which initially receives the gas/oil mixture and an upper chamber 46 including a diffusing element 48 and a coalescing element 50 for removing additional oil from the gas/oil mixture.

The separator tank includes an inlet 52 for receiving a gas/oil mixture. As shown in FIG. 2, in one particular embodiment the inlet 52 preferably opens into the intermediate chamber 44 of the tank 30. The intermediate chamber 44 includes a baffle 54 for changing the velocity of the gas/oil mixture which is introduced into the tank 30 through the inlet 52. In one particular embodiment, the baffle 54 includes a series of plates which project, in an alternating pattern, from opposing walls of the separator tank. The separator tank 30 includes a barrier layer 56 extending between the intermediate chamber 44 and the lower chamber 42 for substantially separating the intermediate and lower chambers 44 and 42 from one another. The barrier layer 56 desirably includes one or more openings 58 extending therethrough so that oil removed from the gas/oil mixture may pass through the barrier layer 56 and into the lower chamber 42. In certain preferred embodiments the one or more openings 58 are provided in a peripheral region of the barrier layer, however, in other embodiments the openings may be provided anywhere on the face of the barrier layer. The barrier layer 56 preferably isolates the oil collected in the lower chamber so that the collected oil does not become re-entrained in the gas/oil mixture. The lower chamber 42 may have a discharge valve 60 so that the oil collected in the lower chamber 42 may be selectively removed from the separator tank 30 and reused in the system. In one embodiment, the discharge valve 60 is an opening through the bottom wall 40 of the tank 30. However, it is contemplated that the discharge valve 60 may be located anywhere adjacent the lower end 38 of the cylindrical wall 32 so long as the discharge valve 60 is capable of being in fluid communication with the lower chamber 42.

The intermediate chamber 44 may include one or more oil scavenges 62 for removing oil from the separator tank 30 directly through the outer wall 32 of the tank 30. As shown in FIG. 2, a first oil scavenge 62 extends through the outer wall 32 of the separator tank 30 and is in fluid communication with the baffle 54 in the intermediate chamber 44. As a result, any oil which coalesces at that portion of the intermediate chamber 44 may be removed directly through the outer wall 32 of the separator tank 30. The oil passed through the scavenge 52 is then preferably directed back upstream so that the oil may be reintroduced into the compressor system.

Figure 5A:
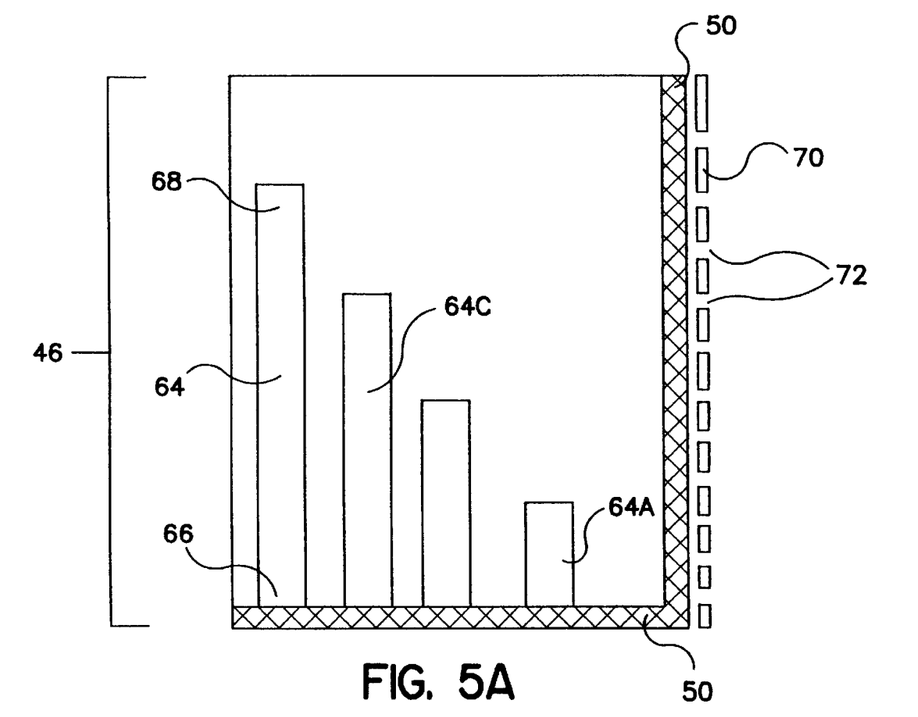
FIG. 5A shows a fragmentary, cross-sectional view of the upper chamber of the separator tank shown in FIG. 2, in accordance with certain preferred embodiments of the present invention.
Figure 5B:
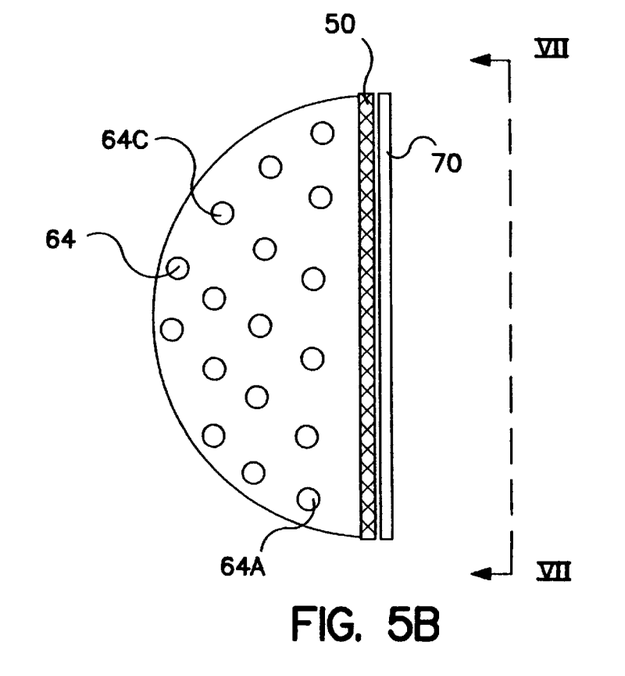
FIG. 5B shows a top view of FIG. 5A.

The upper chamber 46 of the separator tank 30 preferably includes a diffusing element 48 and an oil coalescing element 50 for removing additional oil from the gas/oil mixture. The diffusing element 48 may include a series of diffusing tubes 64 which extend in a substantially vertical direction. The substantially vertical diffusing tubes have first ends 66 which are located adjacent the intermediate chamber 44 and second ends 68 remote therefrom. As shown in FIGS. 5A and 5B the diffusing tubes 64 may have varying lengths. The diffusing element 48 may also include a substantially vertical wall 70 having a plurality of openings 72 therein. As will be shown and described in more detail below, in certain embodiments the lengths of the diffusing tubes 64 increase as the distance of the tubes from the substantially vertical wall 70 increases. The oil coalescing element 50 preferably includes a knitted mesh which surrounds the diffusing tubes 64 for collecting additional particles of oil as the compressed air flows into and out of the tubes 64. In other embodiments, the oil coalescing element may include metal wool, synthetic resin wool, metal beads, metal filings and porous ceramic material. The upper chamber 46 may include one or more oil scavenges 78 for providing an additional outlet for removing oil from the tank 30.

Referring to FIG. 2, the upper chamber 46 also includes one or more outlets 74 for discharging compressed gas from the tank 30 after substantially all of the oil in the gas/oil mixture has been removed therefrom. The outlet 74 preferably includes one or more baffles 76 which create a tortuous path for the compressed gas. Thus, the one or more baffles 76 at the outlet 74 provide an additional stage for removing oil from the gas/oil mixture.

Figure 3:
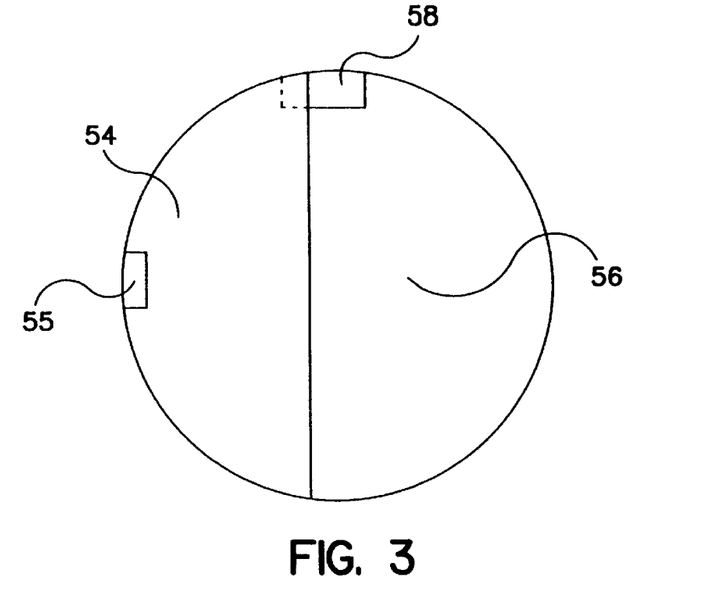
FIG. 3 is a top view of the separator tank of FIG. 2 taken along line III—III, showing a barrier layer for separating the lower and intermediate chambers of the tank.
Figure 4A:
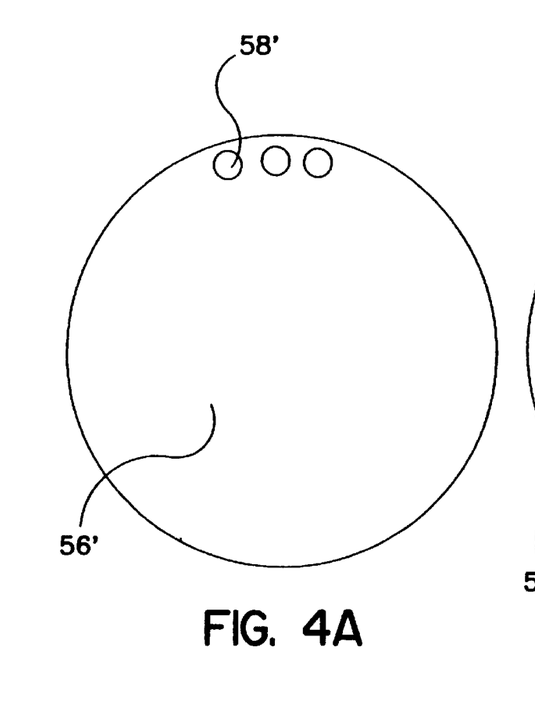
FIG. 4A shows a top view of a barrier layer in accordance with another preferred embodiment of the present invention.
Figure 4B:
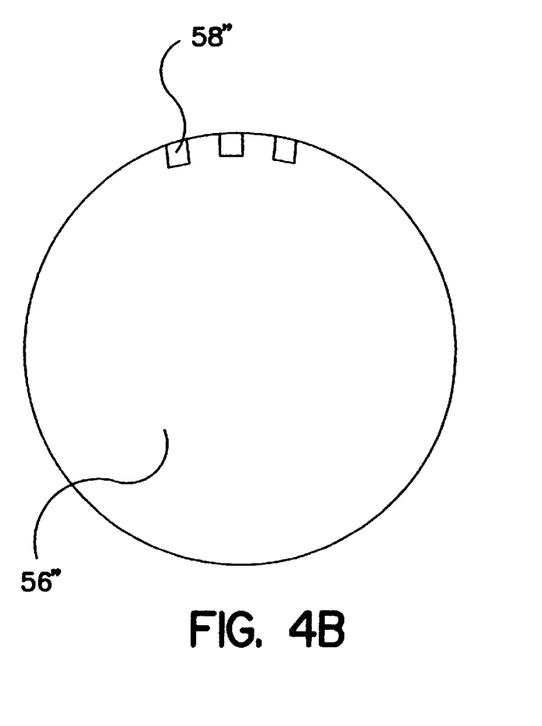
FIG. 4B shows a top view of a barrier layer in accordance with still another preferred embodiment of the present invention.

FIG. 3 shows a cross-sectional view of the separator tank 30 taken along line III—III of FIG. 2. Referring to FIGS. 2 and 3, the barrier layer 56 includes at least one opening 58 at a peripheral portion thereof and the baffle 54 has one or more conduits 55 for directing any oil removed from the gas/oil mixture toward the barrier layer 56. In most preferred embodiments, the one or more conduits 55 are not aligned with the at least one opening 58 in the barrier layer 56. This intentional misalignment of the conduit 55 and the at least one opening 58 in the barrier layer 56 provides a further safeguard against re-entrainment of the oil collected in the lower chamber 42. FIGS. 4A and 4B show further preferred embodiments of the barrier layer. In FIG. 4A the barrier layer 56' includes a plurality of annular openings 58'. FIG. 4B shows another embodiment in which the barrier layer 56" includes a plurality of openings 58" which are generally square or rectangular in shape. Although the embodiments shown in FIGS. 4A and 4B disclose annular and square shape openings, the specific shape of the openings is not critical for efficient operation of the barrier layers shown. In other words, any design which effectively isolates the oil collected in the lower chamber 42 from the stream of compressed gas and oil flowing through the intermediate chamber and upper chambers 44 and 46 will satisfy the requirements set forth above.

FIGS. 5A and 5B show a fragmentary, cross-sectional view of the upper chamber of the separator tank including the diffusing element and the oil coalescing element. The diffusing element includes the diffusing tubes 64 having first ends 66 adjacent the intermediate chamber (FIG. 2) and second ends 68 remote therefrom. The diffusing element also includes a substantially vertical wall 70 having a plurality of openings 72 extending therethrough. In the particular embodiment shown in FIG. 5A, the length of the diffusing tubes 64 increase as the distance between a respective diffusing tube and the vertical wall 70 increases. For example, diffusing tube 64C is longer than diffusing tube 64A. The upper chamber 46 also includes the oil coalescing element 50 having a knit mesh for collecting oil from the gas/oil mixture as the oil passes through the upper chamber 46. In operation, the gas/oil mixture passes through that portion of the oil coalescing element 50 covering the first ends 66 of the diffusing tube 64. The mixture flows in a substantially vertical direction from the first ends 66 to the second ends 68 of the tubes 64. The mixture then exits the second ends 68 of the tubes 64 and turns to the right toward the substantially vertical wall 70. The gas/oil mixture then travels in a substantially horizontal direction toward that portion of the oil coalescing element covering the vertical wall 70. The gas/oil mixture then once again passes through the oil coalescing element 50 and through the openings 72 extending through the vertical wall 70. The mixture then continues toward the outlet (FIG. 2). Referring to FIG. 5B, the diffusing tubes may be provided in rows containing two or more diffusing tubes. In FIG. 5B, the relatively longer diffusing tubes 64C are provided in rows of four tubes, while the relatively shorter diffusing tubes 64A are provided in rows of six tubes.

Figure 6A:
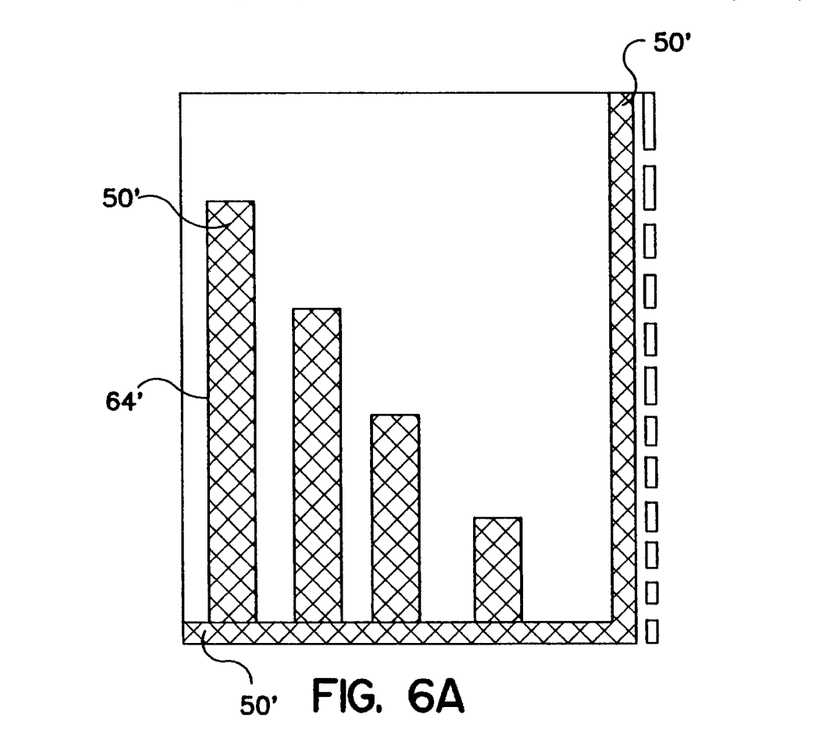
FIG. 6A shows a fragmentary, cross-sectional view of the upper chamber of the separator tank shown in FIG. 2 in accordance with a further preferred embodiment of the present invention.
Figure 6B:
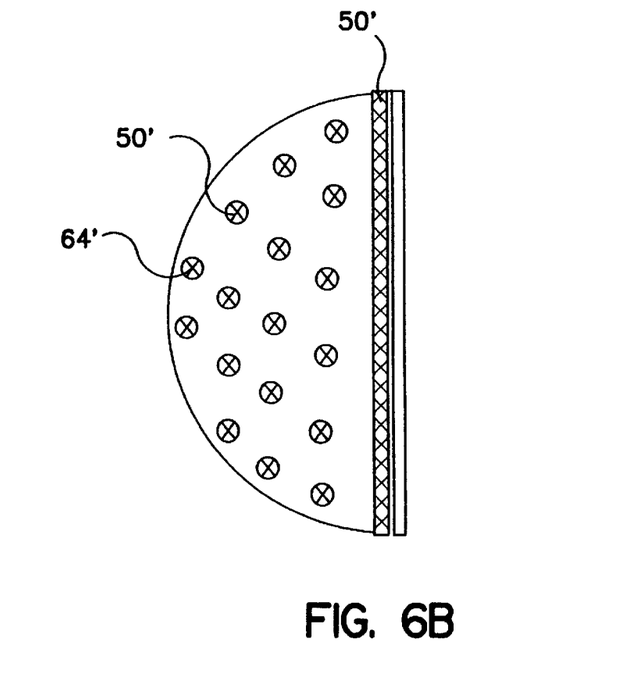
FIG. 6B shows a top view of FIG. 6A.

FIGS. 6A and 6B show another embodiment of the present invention wherein the oil coalescing element 50' is packed inside the diffusing tubes 64. Packing the oil coalescing element 50' inside the diffusing tubes 64 provides a further means for removing oil from the gas/oil mixture.

Figure 7:
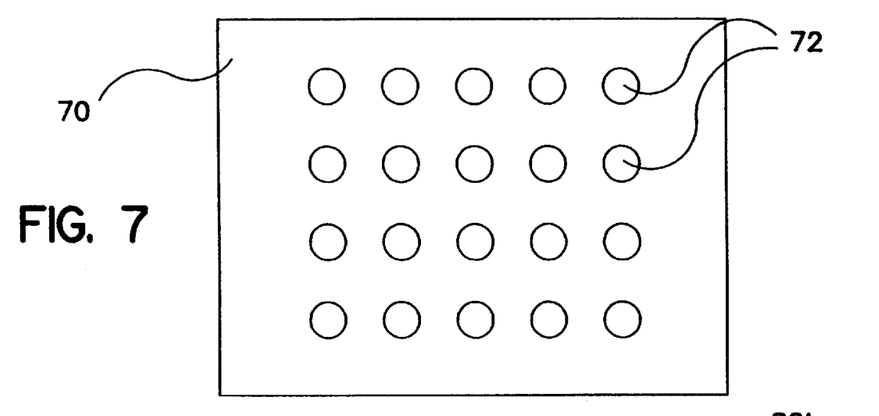
FIG. 7 shows a view of FIG. 5B taken along line VII—VII thereof showing a substantially vertical wall having a plurality of openings extending therethrough.
Figure 8:
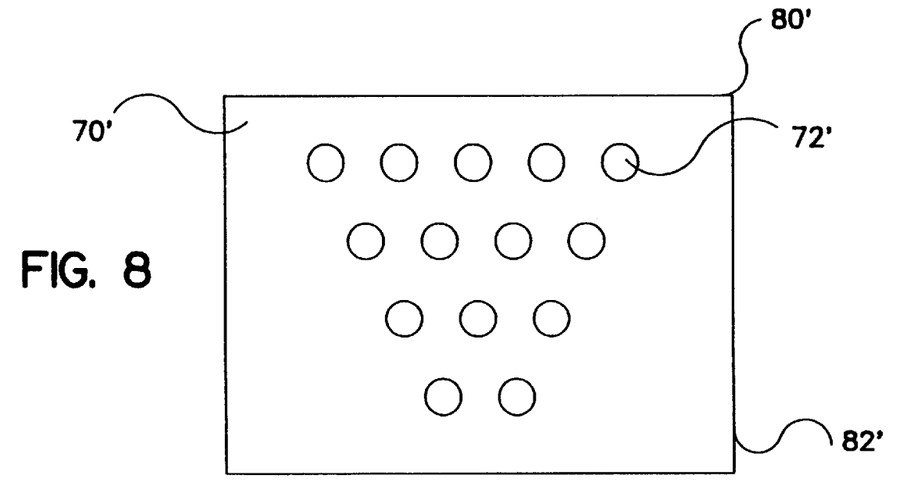
FIG. 8 shows the substantially vertical wall of FIG. 7 in accordance with another preferred embodiment of the present invention.
Figure 9:
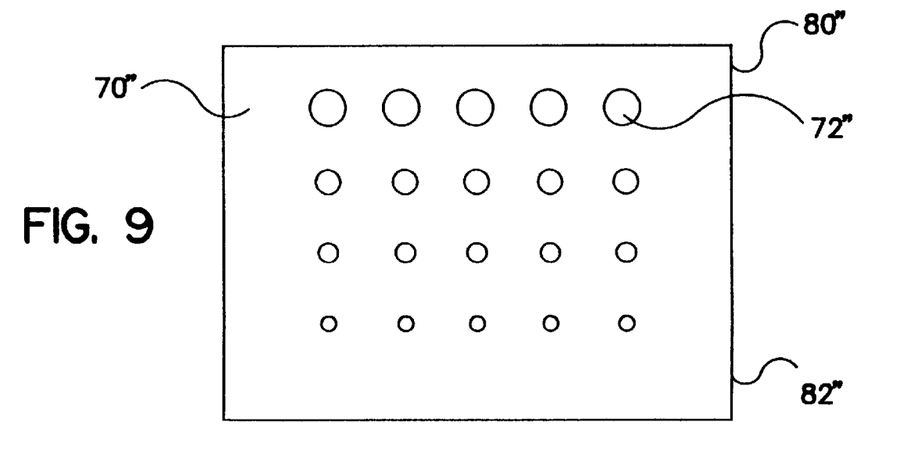
FIG. 9 shows the substantially vertical wall of FIG. 8 in accordance with still another preferred embodiment of the present invention.

Referring to FIG. 7, the substantially vertical wall 70 in the upper chamber preferably includes a plurality of openings 72 extending therethrough. The plurality of openings face the one or more outlets (FIG. 2) of the separator tank so that the gas moves in a substantially horizontal direction toward the outlets. The plurality of openings 72 in the substantially vertical wall 70 are preferably arranged to provide for a single pressure and velocity of the gas as the gas moves toward the outlet. To this end, FIG. 8 shows one preferred embodiment of the substantially vertical wall 70', wherein the number of openings 72' through the wall 70' decrease upon moving from an upper end 80' of the vertical wall 70' toward a lower end 82' of the wall 70'. FIG. 9 shows yet another embodiment of the substantially vertical wall 70", wherein the diameter of the openings 72" through the wall decreases upon moving from the upper end 80" to the lower end 82" thereof. In certain preferred embodiments, the plurality of openings extending through the wall have a diameter of approximately between 1 and 5 mm.

Figure 10:
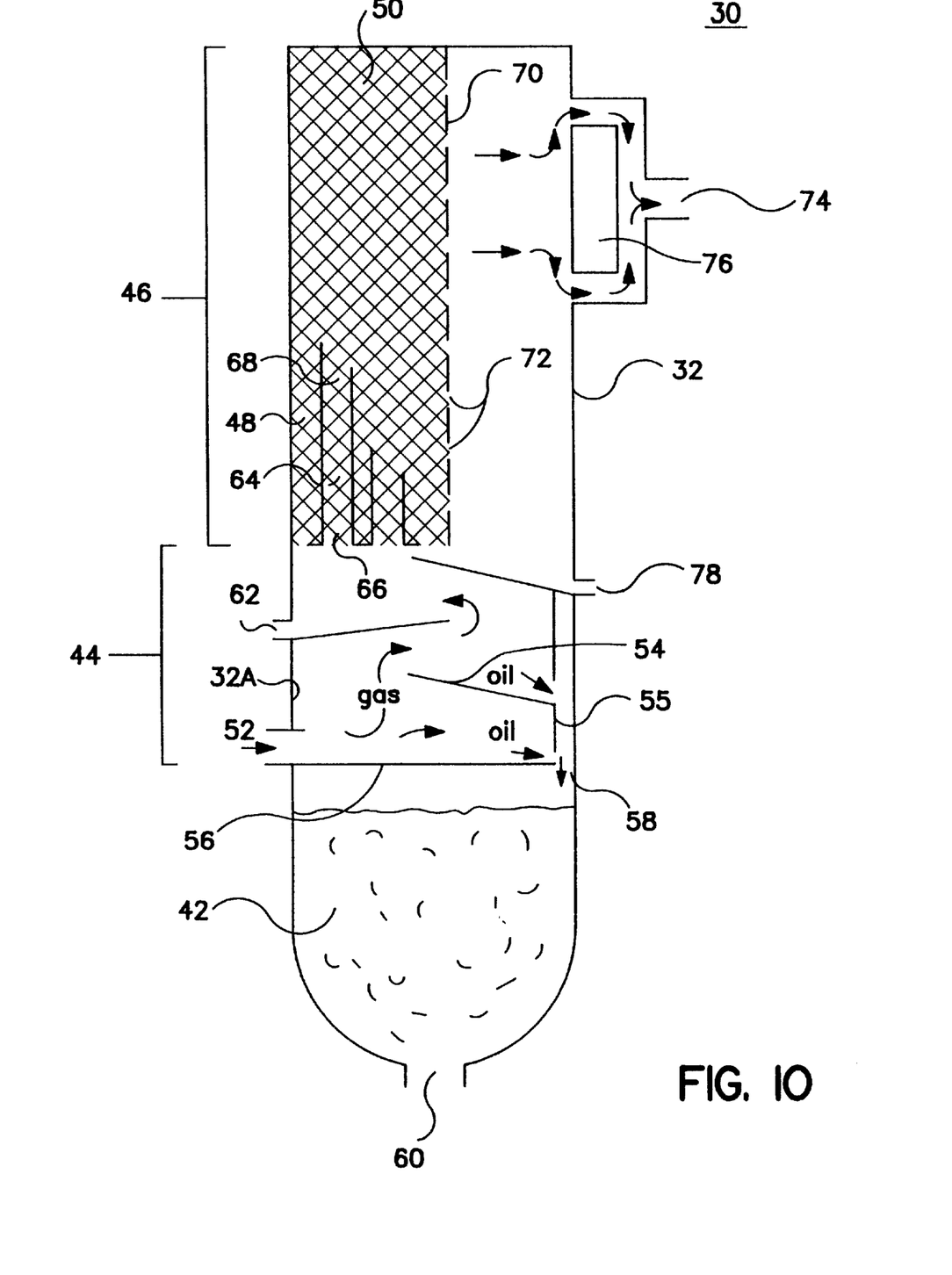
FIG. 10 shows a gas/oil mixture being directed through the oil separator tank of FIG. 2.

Referring to FIG. 10, operation of the oil separator 30 shown and described above will now be discussed in detail. Initially the gas/oil mixture is fed through the inlet 52 to the separator tank and into the intermediate chamber 44. The gas/oil mixture preferably enters the tank at a velocity of approximately 2,500–3,000 feet/minute. In the intermediate chamber 44 the gas/oil mixture passes through a series of baffle plates 54 which change the direction and velocity of the gas/oil mixture. The gas, which is much lighter than the oil, make a relatively sharp turn upward towards the upper chamber 46 while the oil, which is heavier, continues to travel forward and impinges on the baffle 54 or the inner wall 32A of the tank 30. The oil is directed through conduits 55 toward the one or more openings 58 in the barrier layer 56. After the oil passes through the one or more openings 58 in the barrier layer 56, it is stored in the lower chamber 42. The remainder of the gas/oil mixture continues to flow in an upward direction toward the upper chamber 46. Immediately before entering the upper chamber 46, the gas/oil mixture passes a first scavenge 62 in fluid communication with the intermediate chamber 44 and extending through the outer wall 32 of the tank 30. The first scavenge 62 essentially provides an additional path for removing oil from the separator tank 30 and is connected to piping for directing the oil back upstream.

After leaving the intermediate chamber 44, the gas/oil mixture continues upward toward the oil coalescing element 50 and the diffusing element 48 within the upper chamber 46. The mixture passes through the oil coalescing element 50 covering the first ends 66 of the diffusing tubes 64 and continues upward toward the second ends 68 of the tubes. Upon reaching the second ends 68 of the diffusing tubes 64, the gas/oil mixture flows to the right toward the substantially vertical wall 70. Before reaching the vertical wall 70, the gas/oil mixture once again passes through the oil coalescing element 50. The gas/oil mixture then passes through the plurality of openings 72 in the wall 70 and continues to move to the right toward the outlet 74. The outlet 74 includes one or more baffle plates 76 for creating an additional tortuous path for the gas/oil mixture. The additional tortuous path provides another means for removing oil from the gas/oil mixture. Gravitational forces will generally cause the oil collected in the oil coalescing element 50 to drop down and flow out of the tank through the second oil scavenge 78 located in the upper chamber 46 or the first oil scavenge 62 located in the intermediate chamber 44.

Upon reaching the one or more outlets 74, the gas/oil mixture has had substantially all of the oil removed therefrom. Any compressed gas exiting from the separator tank via the one or more outlets has been subjected to both inertial forces and filtering for removing substantially all of the oil from the gas/oil mixture.

Figure 11:
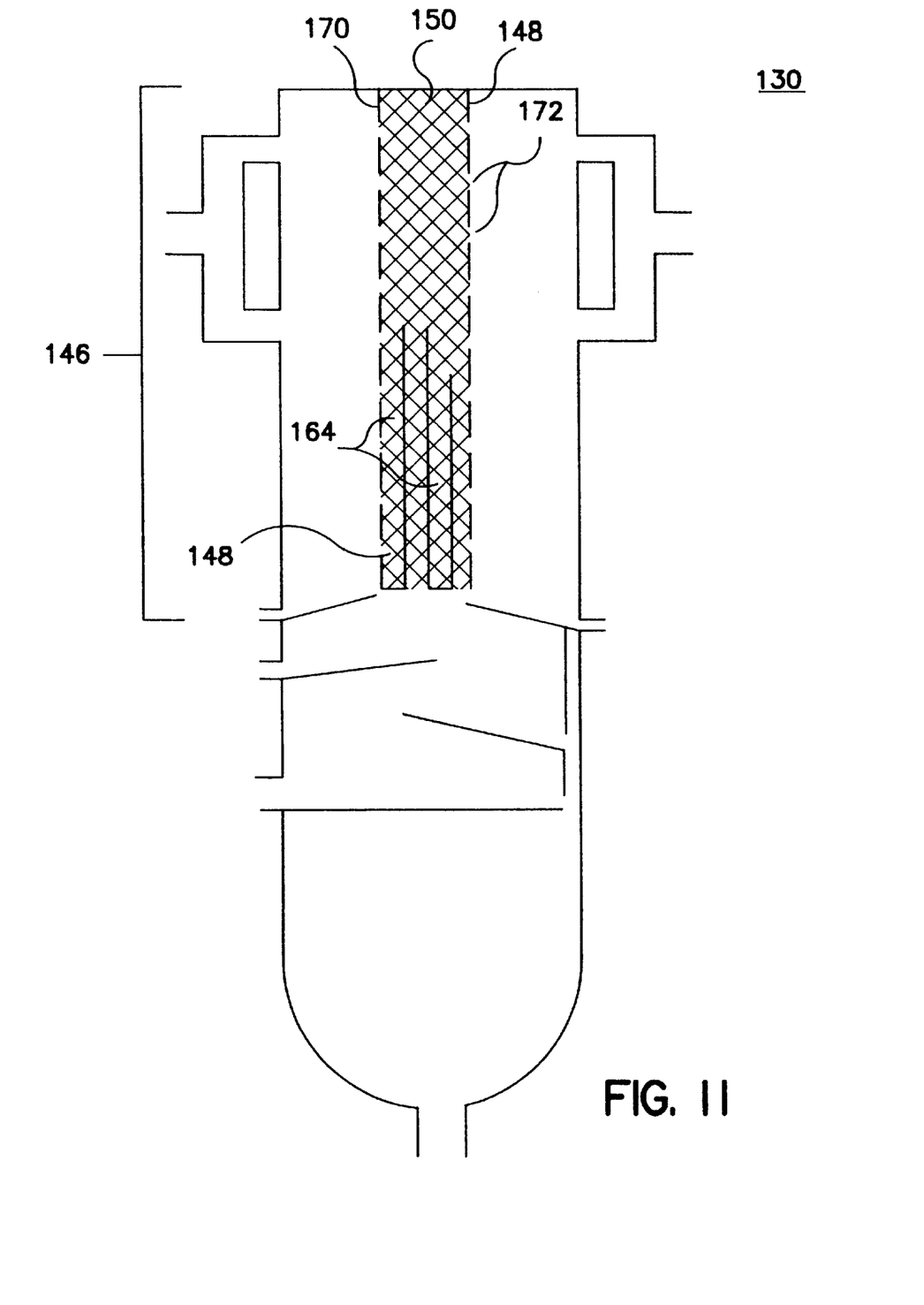
FIG. 11 shows a cross-sectional view of an oil separator tank in accordance with still further preferred embodiments of the present invention.

FIG. 11 shows a separator tank 130 in accordance with another preferred embodiment of the invention wherein the diffusing element 148, including diffusing tubes 164 and vertical wall 170, and the oil coalescing element 150 surrounding the tubes are centrally located within the upper chamber 146 of the separator tank 130. The vertical wall 170 described above in FIGS. 2 and 10 has been modified to include a partially annular portion. In preferred embodiments, the vertical wall 170 may include a substantially cylindrical wall surrounding the diffusing tubes 164 and the oil coalescing element 150. The cylindrical wall 170 preferably has a plurality of openings 172 extending therethrough.

The foregoing disclosure is considered as illustrative only of the principals the invention, and since numerous modifications and changes may readily occur to those skilled in the art, it is not desired to limit the invention to the exact construction and operation shown and described, and accordingly, all suitable modifications and equivalents may be resorted to, falling within the scope of the present invention as described and claimed herein.

What is claimed is:

1. A separator tank for removing oil from a gas/oil mixture comprising:
    a lower chamber for collecting oil removed from said gas/oil mixture;
    an intermediate chamber overlying said lower chamber and an upper chamber overlying said intermediate chamber;

at least one inlet in fluid communication with said intermediate chamber for introducing said gas/oil mixture into said separator tank at a velocity;

said intermediate chamber having a baffle adapted for changing the velocity of said gas/oil mixture as said mixture travels between said inlet and said upper chamber for causing at least some of said oil to separate from said gas/oil mixture;

said upper chamber having a diffusing element for reducing the velocity of said gas/oil mixture and an oil coalescing element for separating at least some of said oil from said gas/oil mixture, wherein said diffusing element includes a first flow element adapted for moving said gas/oil mixture in a substantially vertical direction and a second flow element adapted for moving said gas/oil mixture in a substantially horizontal direction said first flow element comprising a plurality of diffusing tubes having first ends adjacent said intermediate chamber and second ends remote therefrom; and at least one outlet in fluid communication with said upper chamber for discharging gas from said separator tank after said gas/oil mixture has passed through said upper chamber.

2. The separator tank as claimed in claim 1, further comprising a barrier layer extending between and substantially separating said lower and intermediate chambers for preventing said oil collected in said lower chamber from becoming reentrained in said gas/oil mixture.

3. The separator tank as claimed in claim 2, wherein said barrier layer includes one or more openings extending therethrough for allowing said oil removed from said gas/oil mixture to flow from said intermediate chamber to said lower chamber.

4. The separator tank as claimed in claim 1, wherein said separator tank includes an outer wall surrounding at least portions of said lower, intermediate and upper chambers.

5. The separator tank as claimed in claim 4, wherein said outer wall has a substantially cylindrical shape.

6. The separator tank as claimed in claim 4, further comprising at least one oil scavenge extending through said outer wall and opening into said intermediate chamber, wherein at least some of said oil separated from said gas/oil mixture may be removed from said separator tank through said at least one oil scavenge.

7. The separator tank as claimed in claim 4, further comprising at least one oil scavenge extending through said outer wall and opening into said upper chamber, wherein at least some of said oil separated from said gas/oil mixture may be removed from said separator tank through said at least one scavenge.

8. The separator tank as claimed in claim 4, wherein said baffle within said intermediate chamber includes one or more projections extending from an interior region of said outer wall.

9. The separator tank as claimed in claim 3, said intermediate chamber including one or more conduits in fluid communication with said baffle and extending toward said barrier layer for directing at least some of said oil removed from said gas/oil mixture toward said at least one opening in said barrier layer.

10. The separator tank as claimed in claim 1, wherein said diffusing tubes have varying lengths.

11. The separator tank as claimed in claim 10, wherein said second flow element includes a substantially vertical wall having a plurality of apertures extending therethrough.

12. The separator tank as claimed in claim 11, wherein the lengths of said diffusing tubes increase as the distance between said diffusing tubes and said substantially vertical wall increases.

13. The separator tank as claimed in claim 1, wherein said oil coalescing element at least partially surrounds one or more of said diffusing tubes for removing at least some of said oil from said gas/oil mixture as said gas/oil mixture passes therethrough.

14. The separator tank as claimed in claim 1, wherein said oil coalescing element includes a material selected from the group consisting of knitted mesh, metal wool, synthetic resin wool, metal beads, metal filings and porous ceramic material.

15. The separator tank as claimed in claim 11, wherein said plurality of openings in said substantially vertical wall have a diameter of between approximately 1 and 5 mm.

16. The separator tank as claimed in claim 11, wherein at least some of said plurality of openings at a lower end of said substantially vertical wall are smaller than at least some of said plurality of openings at an upper end thereof.

17. The separator tank as claimed in claim 11, wherein at least a portion of said oil coalescing element is in contact with said substantially vertical wall.

18. The separator tank as claimed in claim 1, further comprising an oil discharge valve in fluid communication with said lower chamber for removing said oil collected therein.

19. The separator tank as claimed in claim 1, wherein said intermediate chamber includes one or more oil scavenges adapted for removing at least some of said oil from said separator tank.

20. The separator tank as claimed in claim 1, wherein said upper chamber includes one or more oil scavenges adapted for removing at least some of said oil from said separator tank.

21. The separator tank as claimed in claim 1, wherein said at least one outlet in fluid communication with said upper chamber includes a baffle for removing additional oil from said gas/oil mixture.

22. The separator as claimed in claim 1, wherein said separator tank has an outside diameter of less than approximately six (6) inches.

* * * * *